(12) United States Patent
Bruinenberg

(10) Patent No.: US 9,808,022 B2
(45) Date of Patent: Nov. 7, 2017

(54) PROCESS FOR MANUFACTURING OF A FERMENTED DAIRY PRODUCT

(75) Inventor: Paul Gerard Bruinenberg, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/117,361

(22) PCT Filed: May 15, 2012

(86) PCT No.: PCT/EP2012/058967
§ 371 (c)(1),
(2), (4) Date: Nov. 12, 2013

(87) PCT Pub. No.: WO2012/159922
PCT Pub. Date: Nov. 29, 2012

(65) Prior Publication Data
US 2014/0113028 A1    Apr. 24, 2014

(30) Foreign Application Priority Data

May 26, 2011 (EP) ..................................... 11167749

(51) Int. Cl.
*A23C 9/123*    (2006.01)
(52) U.S. Cl.
CPC .......... *A23C 9/1238* (2013.01); *A23C 9/1236* (2013.01); *A23Y 2240/65* (2013.01)
(58) Field of Classification Search
CPC .................................................... A23C 9/1238
USPC ........................................ 426/43; 435/253.4
See application file for complete search history.

(56) References Cited

U.S. PATENT DOCUMENTS

| 6,025,008 | A  | * | 2/2000 | Akahoshi et al. ............. 426/583 |
| 9,648,891 | B2 | * | 5/2017 | Robichon ............ A23C 9/1238 |
| 2007/0292561 | A1 | * | 12/2007 | Garault et al. .................. 426/18 |
| 2009/0068310 | A1 | * | 3/2009 | Bot et al. ......................... 426/39 |

FOREIGN PATENT DOCUMENTS

| JP | 2010-115126 | 5/2010 |
| WO | 2007095958 | 8/2007 |
| WO | 2010066907 | 6/2010 |
| WO | WO 2010139765 A2 * | 12/2010 |

OTHER PUBLICATIONS

Broadbent et al. in Biochemistry, Genetics, . . . *Streptococcus thermophilus*: A Review J Dairy Sci. 86: 407-423, 2003.*
NPL Skim Milk Powder [in www.MilkIngredients.ca (pp. 1-22, yr 2011)]. http://www.milkingredients.ca.*
International Search Report for PCT/EP2012/058967 Mailed Jul. 5, 2012.
Vaningelgem, Frederik et al., "Biodiversity of Exopolysaccharides Produced by *Streptococcus thermophilus* Strains is Reflected in Their Production and Their Molecular and Functional Characteristics", Applied and Environmental Microbiology, American Society for Microbiology, Feb. 2004, pp. 900-912, vol. 70, No. 2.

* cited by examiner

*Primary Examiner* — Jill Warden
*Assistant Examiner* — Bhaskar Mukhopadhyay
(74) *Attorney, Agent, or Firm* — McBee Moore Woodward & Vanik IP, LLC

(57) ABSTRACT

A process for the manufacture of a fermented dairy product comprising (a) subjecting a milk base to fermentation with a starter comprising of a weakly post-acidifying bacterial culture, until a desired pH value in the range of 4.0 and 5.0 is reached (end of fermentation), (b) optionally cooling the fermented milk base obtained in step (a); and (c) packaging the fermented dairy product.

8 Claims, No Drawings

PROCESS FOR MANUFACTURING OF A FERMENTED DAIRY PRODUCT

CROSS REFERENCE TO RELATED APPLICATIONS

This application is a §371 National Stage Application of PCT/EP2012/058967, filed May 15, 2012, which claims priority to European Application No. 11167749.8, filed May 26, 2011.

BACKGROUND OF THE INVENTION

Field of the Invention

The present invention relates to a process for manufacturing fermented dairy products, in particular stirred milk products.

Description of Related Art

Lactic acid bacteria are extensively used for production of fermented foods, and they greatly contribute to flavor, texture and overall characteristics of these products. An old and well known example is yoghurt which probably originated from the Middle East and which still makes up more than half of the fermented milk production—or approximately 19 million tons in 2008 (source: Euromonitor). Fermented milks as e.g. yoghurts are popular due to the healthy image and pleasant sensory properties.

In many parts of the world an increasing interest in low fat fermented milk products is seen. This poses significant challenges for lactic acid bacteria culture as well as for the production process because it is difficult to produce low fat fermented milk products without reduction of sensory quality.

Yoghurt is produced from milk that has been standardized with respect to fat and protein content, homogenized and heat treated. Hereafter the milk is inoculated with a culture of *Streptococcus salivarius thermophilus* and *Lactobacillus delbrueckii* subsp. *bulgaricus* in large stirred fermentation or culturing tanks and subsequently fermented to a pH of around 4.5. In addition to the traditional yoghurt culture, a probiotic culture, as e.g. *Bifidobacterium*, can be applied to add extra heath benefits.

In many countries the produced yoghurt product is transported and stored, for instance at storehouses and shops, at ambient temperature, i.e. at temperatures between 20 and 30° C. As a result of this high temperature the lactic acid bacteria in the yoghurt continue to produce acid. This has a negative impact on the taste and texture of the final yoghurt product. A solution to this problem is a starter culture that stops acidifying the yoghurt at a certain pH when stored at ambient temperature. This concept is referred to as Low Post Acidification.

In order to control final acidity, some manufacturers also use specially selected strains of *Lactobacillus delbrueckii* subsp *bulgaricus* that do not post acidify and limited quantities of glucose on the fermentation media.

Consequently, there is a need for an alternative cost-efficient process for manufacturing fermented milk that combines high texture preservation and sustainable acidity control during transport and storage.

As used herein the term "milk base" includes whole milk, skim milk, fat-free milk, low fat milk, full fat milk, lactose-free or lactose-reduced milk (produced by hydrolyzing the lactose by lactase enzyme to glucose and galactose, or by other methods such as nanofiltration, electro dialysis, ion exchange chromatography and centrifugation technology), concentrated milk or dry milk.

"Fat-free milk" is non-fat or skim milk product. Low-fat milk is typically defined as milk that contains from about 1% to about 2% fat. Full fat milk often contains 2% fat or more.

The term "milk" is intended to encompass milks from mammals and plant sources or mixtures thereof. Preferably, the milk is from a mammal source. Mammals sources of milk include, but are not limited to cow, sheep, goat, buffalo, camel, llama, mare and deer. In an embodiment, the milk is from a mammal selected from the group consisting of cow, sheep, goat, buffalo, camel, llama, mare and deer, and combinations thereof. Plant sources of milk include, but are not limited to, milk extracted from soy bean, pea, peanut, barley, rice, oat, quinoa, almond, cashew, coconut, hazelnut, hemp, sesame seed and sunflower seed. Soy bean milk is preferred. In addition, the term "milk" refers to not only whole milk, but also skim milk or any liquid component derived thereof.

As used in this specification, the term "fermented dairy product" or "acidified dairy product" is intended to refer to products which are obtained by the multiplication of lactic acid bacteria in a milk base leading to a milk coagulum. The milk preparation used as raw material for the fermentation may be skimmed or non-skimmed milk, optionally concentrated or in the form of powder. Furthermore, this milk preparation may have been subjected to a thermal processing operation which is at least as efficient as pasteurization. The particular characteristics of the various fermented dairy products depend upon various factors, such as the composition of milk base, the incubation temperature, the lactic acid flora and/or non-lactic acid flora. Thus, fermented dairy products manufactured herein include, for instance, various types of regular yoghurt, low fat yoghurt, non fat yoghurt, kefir, dahi, ymer, buttermilk, butterfat, sour cream and sour whipped cream as well as fresh cheeses.

As used in the present specification, the term "yoghurt" refers to products comprising "lactic acid bacteria such as *Streptococcus salivarius thermophilus* and *Lactobacillus delbruekii* subsp. *bulgaricus*, but also, optionally, other microorganisms such as *Lactobacillus delbruekii* subsp. *lactis, Bifidobacterium animalis* subsp. *lactis, Lactococcus lactis, Lactobacillus acidophilus* and *Lactobacillus casei*, or any microorganism derived therefrom. The lactic acid strains other than *Streptococcus salivarius thermophilus* and *Lactobacillus delbruekii* subsp. *bulgaricus*, are intended to give the finished product various properties, such as the property of promoting the equilibrium of the flora."

As used herein, the term "yoghurt" encompasses set yoghurt, stirred yoghurt, drinking yoghurt, Petit Suisse, heat treated yoghurt and yoghurt-like products. Preferably, the yoghurt is a stirred yoghurt or a drinking yoghurt. More preferably, the yoghurt is a stirred yoghurt. The term "yoghurt" encompasses, but is not limited to, yoghurt as defined according to French and European regulations, e.g. coagulated dairy products obtained by lactic acid fermentation by means of specific thermophilic lactic acid bacteria only (i.e. *Lactobacillus delbruekii* subsp. *bulgaricus* and *Streptococcus salivarius thermophilus*) which are cultured simultaneously and are found to be live in the final product in an amount of at least 10 million CFU (colony-forming unit)/g. Preferably, the yoghurt is not heat-treated after fermentation. Yoghurts may optionally contain added dairy raw materials (e.g. cream) or other ingredients such as sugar or sweetening agents, one or more flavouring(s), fruit, cereals, or nutritional substances, especially vitamins, minerals and fibers. Such yoghurt advantageously meets the specifications for fermented milks and yoghurts of the AFNOR NF 04-600 standard and/or the codex StanA-IIa- 1975 standard. In order to satisfy the AFNOR NF 04-600 standard, the product must not have been heated after fermentation and the dairy raw materials must represent a minimum of 70% (m/m) of the finished product.

In the present context, the terms "fresh cheese", "unripened cheese", "curd cheese" and "curd-style cheese" are used interchangeably herein to refer to any kind of cheese such as natural cheese, cheese analogues and processed cheese in which the protein/casein ratio does not exceed that of milk.

The term "starter" or "starter culture" as used herein refers to a culture of one or more food-grade micro-organisms, in particular lactic acid bacteria, which are responsible for the acidification of the milk base. Starter cultures may be fresh (liquid), frozen or freeze-dried. Freeze dried cultures need to be regenerated before use. For the production of a fermented dairy product, the starter is usually added in an amount from 0.01 to 3%, preferably from 0.01 and 0.02% by weight of the total amount of milk base.

As used herein, the term "lactic acid bacteria" (LAB) or "lactic bacteria" refers to food-grade bacteria producing lactic acid as the major metabolic end-product of carbohydrate fermentation. These bacteria are related by their common metabolic and physiological characteristics and are usually Gram positive, low-GC, acid tolerant, non-sporulating, non-respiring, rod-shaped bacilli or cocci. During the fermentation stage, the consumption of lactose by these bacteria causes the formation of lactic acid, reducing the pH and leading to the formation of a protein coagulum. These bacteria are thus responsible for the acidification of milk and for the texture of the dairy product. As used herein, the term "lactic acid bacteria" or "lactic bacteria" encompasses, but is not limited to, bacteria belonging to the genus of *Lactobacillus* spp., *Bifidobacterium* spp., *Streptococcus* spp., *Lactococcus* spp., such as *Lactobacillus delbruekii* subsp. *bulgaricus*, *Streptococcus salivarius thermophilus*, *Lactobacillus lactis*, *Bifidobacterium animalis*, *Lactococcus lactis*, *Lactobacillus casei*, *Lactobacillus plantarum*, *Lactobacillus helveticus*, *Lactobacillus acidophilus* and *Bifidobacterium breve*.

As used in the present specification, the term "cooling step" or "cooling step for stopping fermentation" means lowering the temperature of the fermented product in order to stop or to dramatically slow down the fermentation process. The cooling step generally lasts less than one minute, preferably about 10-20 seconds. In an embodiment, during the cooling step, the temperature of the fermented product is lowered of at least 10° C., preferably of at least 15° C. and more preferably of at least 20° C. In a preferred embodiment, during the cooling step, the temperature of the fermented product is lowered of at least 25° C. In a particular embodiment, the temperature of the fermented product after the cooling step is in the range of 5° C. to 30° C., preferably in the range of 10° C. to 25° C., more preferably in the range of 10° C. to 20° C., and still more preferably between 10° C. and 15° C.

The term "weakly post-acidifying" or "low post-acidifying" refers to the acidification profile of a bacterium or a bacterial culture useful in the present invention. Post-acidification is the production of lactic acid occurring after the end of the fermentation. This phenomenon is usually controlled by the cooling of the product after fermentation. Indeed, this cooling step stops or slows down the bacterium metabolism and thus reduces the production of lactic acid. In the process of the present invention, this cooling step has been suppressed thanks to the use of bacterium cultures with weakly post-acidifying properties as a starter. These cultures are characterized by a weak production of lactic acid at fermentation temperature after the end of the fermentation step thereby providing a substantially steady pH value.

Weakly post-acidifying bacterium cultures may be selected by the follow-up of the pH of a final fermented milk base by using any method known by the skilled person. As example, a CINAC system (CINetic ACidification) may be used. In this system a pH meter is connected to a computer recorder and pH is continuously recorded as a function of time to obtain sigmoidal curves representing the acidification. During the follow-up of the pH, the milk is maintained at fermentation temperature in a thermoregulated bath. This method is exemplified in the experimental section.

In a particular embodiment, the weakly post-acidifying culture is a culture having a two-phase acidification profile in a milk base comprising 3.6% (w/w) protein, 1.5 (w/w) fat, 4.6% (w/w) carbohydrates and 2% (w/v) RSM powder (referred to as Dutch milk) and/or 2.9% (w/w) protein, 3.6% (w/w) fat, 4.7% (w/w) carbohydrates (referred to as Chinese milk), as determined by the continuous recordation of the pH as a function of time, comprising an initial period lasting 8 to 24 hours of sigmoidal pH decrease down to a pH value of above 4.0, followed by a period of at least 33 days in which the pH value does not fluctuate more than 0.3 unit. Thus, according to the present invention the weakly post-acidifying culture may be selected as having the mentioned two-phase acidification profile in a screening process involving continuously measuring the pH in a milk base comprising 3.6% (w/w) protein, 1.5% (w/w) fat, 4.6% (w/w) carbohydrates and 2% (w/v) RSM powder (referred to as Dutch milk) and 2.9% (w/w) protein, 3.6 (w/w) fat, 4.7% (w/w) carbohydrates (referred to as Chinese milk), inoculated with the weakly post-acidifying culture, and exemplified in the Examples below.

As used in the present specification, the term "exopolysaccharide-producing strain" or "EPS-producing strain" refers to bacteria which are capable of producing polysaccharides, namely exopolysaccharides (EPS), in their culture medium. EPS-producing strains are particularly interesting in dairy product manufacture because they can provide a ropy character and/or a smooth and creamy texture to a fermented dairy product. The produced polysaccharides can be divided into two groups: homopolysaccharides and heteropolysaccharides. Homopolysaccharides consist of the repeated assembly of a single sugar and can be subdivided into four groups, namely α-D-glucans, β-D-glucans, β-D-fructans and others like polygalactan. Heteropolysaccharides consist of the assembly of several different sugars forming a repeating unit most often containing a combination of D-glucose, D-galactose, and L-rhamnose, and, in a few cases, fucose, nononic acid, ribose, acetylated amino sugars and glucuronic acid, as well as non-carbohydrate substituents such as phosphate, acetyl and glycerol.

SUMMARY

In a first aspect the invention provides a process for the manufacture of a fermented dairy product comprising (a) subjecting a milk base to fermentation with a starter comprising a weakly post-acidifying bacterial culture, until a desired pH value in the range of 4.0 and 5.0 is reached (end of fermentation); (b) optionally cooling the fermented milk base obtained in step (a); and (c) packaging the fermented dairy product, wherein the pH value of the fermented dairy product does not fluctuate more than 0.3 pH unit upon storage from day 1 after end of fermentation until day 28 after end of fermentation. Preferably the pH does not fluctuate more than 0.2 pH, more preferably said pH does not fluctuate more than 0.1 pH In the context of the present invention, the weakly post-acidifying bacterial culture is defined as having a two-phase acidification profile, as determined by the continuous recordation of the pH as a function of time, in a Dutch milk composition comprising 1.5% (w/w) fat, 3.6% (w/w) protein, 4.6% (w/w) carbohydrates and 2% RSM powder and/or a Chinese milk composition comprising 2.9% (w/w) protein, 3.6% (w/w) fat, 4.7% (w/w) carbohydrates at 42° C., comprising an initial period between inoculation and end of fermentation followed by a period at 30° C. between 1 and 40 days in which the pH value does not fluctuate more than 0.3 unit.

DETAILED DESCRIPTION OF A PREFERRED EMBODIMENT

The advantage of the use of a weakly post-acidifying bacterial culture is that the pH value does not fluctuate more than 0.3 pH unit upon storage measured from day 1 following end of fermentation. The storage conditions at which said pH does not fluctuate more than 0.3 pH may be 1 day or more or may be 40 days or less and the storage temperature may be from 0° C. to 40° C., preferably from 10° C. to 30° C., including said temperatures. In a preferred embodiment, said pH does not fluctuate more than 0.2 pH, more preferably said pH does not fluctuate more than 0.1 pH.

Preferably, the fermented dairy product is as defined hereinbefore such any type of regular yoghurt, low fat yoghurt, non fat yoghurt, kefir, dahi, ymer, buttermilk, butterfat, sour cream and sour whipped cream as well as fresh cheeses. Most preferably, the fermented dairy product is yoghurt as defined hereinbefore such as set yoghurt, stirred yoghurt, drinking yoghurt, Petit Suisse, heat treated yoghurt and yoghurt-like products. More preferably, the yoghurt is a stirred yoghurt or a drinking yoghurt.

The weakly post-acidifying bacterial culture can be any culture having a two-phase acidification profile in Dutch and/or Chinese milk as defined hereinbefore. Preferably the weakly post-acidifying bacterial culture is selected from the genus *Streptococcus*, more preferably *Streptococcus salivarius thermophilus*. Most preferably, the weakly post-acidifying bacterial culture is selected from the group consisting of CBS129457 and CBS129458 deposited on 6 May 2011 at the Centraalbureau voor Schimmelcultures (Fungal Biodiversity Centre), Utrecht, The Netherlands.

In a preferred embodiment, the starter further comprises at least one *Lactobacillus delbrueckii* subsp *bulgaricus* strain, more preferably at least one *Lactobacillus delbrueckii* subsp *bulgaricus* and at least *Streptococcus salivarius thermophilus* strain selected from the group consisting of CBS129457 and CBS129458 deposited on 6 May 2011 at the Centraalbureau voor Schimmelcultures (Fungal Biodiversity Centre), Utrecht, The Netherlands.

In another preferred embodiment, the starter comprises an exopolysaccharide-producing bacterium strain as have been defined hereinbefore. This may be a *Lactobacillus*, or a weakly post-acidifying bacterial such as a *Streptococcus salivarius thermophilus* strain described hereinbefore or another strain.

In the process of the invention, the fermented dairy product is maintained at a fermentation temperature until the desired pH value in the range of 4.0 and 5.0 is reached (end of fermentation) preferably 4.0 to 4.7 and more preferably in the range of 4.2 to 4.5. For a Dutch fermented milk product the pH is preferably in the range of 4.2-5.0. The length of the fermentation period is not critical for the present invention and can be determined easily by the skilled person. The fermentation temperature may be in the range of 30° C.-45° C., more preferably in the range of 37° C.-42° C.

In the process of the invention, any milk can be used such as the milk from a mammal selected from the group consisting of cow, sheep, goat, buffalo, camel, llama, mare, deer, and combinations thereof. Preferably the milk of cow, more preferably Dutch milk or Chinese milk is used.

Preferably, the fermentation is not stopped by exhaustion of a nutrient added to the milk base, but by cooling as in step (b) of the process of the invention. In this embodiment, the fermented dairy product may be cooled down from the fermentation temperature as defined above, for example a temperature between 30 and 45° C., to a lower temperature, for example in a range between 4 and 20° C., more preferably below 10° C., most preferably between 4 and 7° C.

In a second aspect the invention provides a weakly post-acidifying bacterial culture having a two-phase acidification profile, as determined by the continuous recordation of the pH as a function of time, in a Dutch milk composition comprising 1.5% (w/w) fat, 3.6% (w/w) protein, 4.6% (w/w) carbohydrates and 2% RSM powder and/or a Chinese milk composition comprising 2.9% (w/w) protein, 3.6% (w/w) fat, 4.7% (w/w) carbohydrates at 42° C., comprising an initial period between inoculation and end of fermentation followed by a period at 30° C. between 1 and 40 days in which the pH value does not fluctuate more than 0.3 unit. Preferably the pH does not fluctuate more than 0.2 pH, more preferably said pH does not fluctuate more than 0.1 pH In a preferred embodiment, the bacterial culture comprises at least one weakly post-acidifying bacterial culture of the genus *Streptococcus* more preferably the strain *Streptococcus salivarius thermophilus*. Highly preferred is a *Streptococcus salivarius thermophilus* strain selected from the group consisting of CBS129457 and CBS129458 deposited on 6 May 2011 at the Centraalbureau voor Schimmelcultures (Fungal Biodiversity Centre), Utrecht, The Netherlands.

In a third aspect the invention provides the use of a weakly post-acidifying bacterial culture as defined in the second aspect of the invention in a process for the production of a fermented dairy product.

MATERIALS AND METHODS
Cultures

| CBS-number | Strain | Deposit date* |
|---|---|---|
| CBS129457 | *Streptococcus salivarius thermophilus* | 6 May 2011 |
| CBS129458 | *Streptococcus salivarius thermophilus* | 6 May 2011 |
| CBS132133 | *Streptococcus salivarius thermophilus* | 13 Mar. 2012 |

*deposited at the Centraalbureau voor Schimmel-cultures (Fungal Biodiversity Centre), Utrecht, The Netherlands The *streptococcus* strains CBS129457 and CBS129458 are EPS-producing strains that produce a highly viscous, smooth yoghurt product.

*Lactobacillus delbrueckii* subsp. *bulgaricus* 100-B is a commercial culture strain and can be obtained from DSM Food Specialties B.V., Delft, The Netherlands—www.dsm.com.

Preculturing of the Cultures

Selected *Streptococcus salivarius thermophilus* strains and a *Lactobacillus delbrueckii* subsp. *bulgaricus* 100-B were precultured overnight at 37° C. in 10% (w/v) reconstituted skimmed milk (RSM) (Nilac, NIZO food research) supplemented with 0.05% (w/v) yeast extract.

Milk Type
  Dutch milk composition: 3.6% (w/w) protein, 1.5% (w/w) fat, 4.6% (w/w) carbohydrates and 2% (w/v) RSM powder
  Chinese milk composition: 2.9% (w/w) protein, 3.6% (w/w) fat, 4.7% (w/w) carbohydrates Example 1

Dutch or Chinese milk was inoculated with $10^7$ cfu/ml Streptococci inoculum from a full-grown preculture and $10^3$ cfu/ml *Lactobacillus bulgaricus* 100-B inoculation from a full-grown preculture. The inoculated milk was incubated at temperature of 42° C. until a pH of approximately 4.6 was reached (end of fermentation). The yoghurts were quickly cooled in melting ice water (0° C.) and subsequently stored at indicated temperatures 10, and 30° C. for up to 33 days. The pH of yoghurts was monitored at indicated time intervals.

The results in Table 1 show that the pH of yoghurts obtained at the end of the fermentation step does not substantially change upon storage between day 1 and day 33. At 10° C., 20° C. and 30° C. storage for 33 days, the pH value of yoghurts is in all cases higher than 4.1. A pH value above 4.1 of a yoghurt product is considered as advantageous for taste perception by the consumers.

TABLE 1 a: pH of yoghurts at the end of fermentation and during storage at 10° C. for up to 33 days. Yoghurts are prepared with indicated Streptococcal strains and a *Lactobacillus delbrueckii* subsp *bulgaricus*.

| Strains | Milk type | end fermentation | day 1 | day 7 | day 15 | day 28 | day 33 |
|---|---|---|---|---|---|---|---|
| | | | storage temp 10° C. | | | | |
| CBS129458 | Dutch milk | 4.62 | 4.42 | 4.37 | 4.37 | 4.37 | 4.37 |
| CBS129457 | Dutch milk | 4.62 | 4.48 | 4.34 | 4.31 | 4.30 | 4.30 |
| CBS129458 | Chinese milk | 4.60 | 4.28 | 4.22 | 4.23 | 4.20 | 4.20 |
| CBS129457 | Chinese milk | 4.60 | 4.38 | 4.28 | 4.24 | 4.23 | 4.23 | b: pH of yoghurts at the end of fermentation and during storage at 20° C. for up to 33 days. Yoghurts are prepared with indicated streptococcal strains and a *Lactobacillus delbrueckii* subsp *bulgaricus*.

| Strains | Milk type | end fermentation | day 1 | day 7 | day 15 | day 28 | day 33 |
|---|---|---|---|---|---|---|---|
| | | | storage temp 20° C. | | | | |
| CBS129458 | Dutch milk | 4.62 | 4.37 | 4.33 | 4.34 | 4.33 | 4.29 |
| CBS129457 | Dutch milk | 4.62 | 4.37 | 4.29 | 4.30 | 4.29 | 4.24 |
| CBS129458 | Chinese milk | 4.60 | 4.24 | 4.20 | 4.19 | 4.17 | 4.15 |
| CBS129457 | Chinese milk | 4.60 | 4.30 | 4.22 | 4.22 | 4.21 | 4.19 | c: pH of yoghurts at the end of fermentation and during storage at 30° C. for up to 33 days. Yoghurts are prepared with indicated streptococcal strains and a *Lactobacillus delbrueckii* subsp *bulgaricus*.

| Strains | Milk type | end fermentation | day 1 | day 7 | day 15 | day 28 | day 33 |
|---|---|---|---|---|---|---|---|
| | | | storage temp 30° C. | | | | |
| CBS129458 | Dutch milk | 4.64 | 4.32 | 4.29 | 4.31 | 4.26 | 4.26 |
| CBS129457 | Dutch milk | 4.62 | 4.31 | 4.25 | 4.28 | 4.26 | 4.26 |
| CBS129458 | Chinese milk | 4.60 | 4.17 | 4.15 | 4.14 | 4.14 | 4.14 |
| CBS129457 | Chinese milk | 4.60 | 4.19 | 4.18 | 4.17 | 4.15 | 4.15 |

The results in Table 2 show that the pH of yoghurts obtained at the end of the fermentation step do substantially change upon storage with the control strain CBS132133.

TABLE 2 a: pH of yoghurts at the end of fermentation and during storage at 10° C. for up to 28 days. Yoghurts are prepared with the indicated Streptococcal strain and a *Lactobacillus delbrueckii* subsp *bulgaricus*.

| Strain | Milk type | end fermentation | day 1 | day 7 | day 14 | day 21 | day 28 |
|---|---|---|---|---|---|---|---|
| | | | storage temp 10° C. | | | | |
| CBS132133 | Dutch milk | 4.62 | 4.39 | 4.14 | 4.17 | 4.14 | 4.08 |
| | | | storage temp 20° C. | | | | |
| CBS132133 | Dutch milk | 4.62 | 4.32 | 4.11 | 4.08 | 4.14 | 4.11 |
| | | | storage temp 30° C. | | | | |
| CBS132133 | Dutch milk | 4.62 | 4.22 | 4.10 | 4.10 | 4.04 | 3.90 |

The invention claimed is:

1. A process for manufacturing a fermented dairy product comprising:
    a. subjecting a milk base to fermentation with a starter comprising at least one *Streptococcus salivarius thermophilus* strain and at least one *Lactobacillus delbrueckii* subsp *bulgaricus* strain, until a desired pH value in a range of 4.0 and 5.0 is reached immediately at the end of fermentation;
    b. optionally cooling a fermented milk base obtained in (a); and
    c. packaging the fermented dairy product, wherein at least one *Streptococcus salivarius thermophilus* strain is weakly post-acidifying,
wherein at least one *Streptococcus salivarius thermophilus* strain is selected from the group consisting of CBS129457 and CBS129458 and
wherein the pH value of the packaged fermented dairy product is not less than 4.1 and does not fluctuate more than 0.3 pH unit upon storage at 20° C. or 30° C. for 33 days after the end of fermentation, and
wherein weakly post-acidifying is defined as having a two-phase acidification profile,
wherein the two-phase acidification profile is determined by continuous recordation of pH as a function of time comprising an initial period from inoculation to end of fermentation followed by a period where pH does not fluctuate more than 0.3 pH unit in a Dutch milk composition comprising 1.5% (w/w) fat, 3.6% (w/w) protein, 4.6% (w/w) carbohydrates and 2% RSM powder to make Dutch fermented milk product.

2. The process of claim 1, wherein the fermented dairy product is a yoghurt.

3. The process according to claim 1, wherein the fermentation temperature is from 30° C. to 45° C.

4. The process according to claim 1, wherein the desired pH value is from 4.0 to 4.7.

5. The process according to claim 1, wherein said milk base is from at least one mammal and/or at least one plant source and/or a mixture thereof, and/or from a mammal selected from the group consisting of a cow, a sheep, a goat, a buffalo, a camel, a llama, a mare, a deer, and/or a combination thereof.

6. The process according to claim 1, wherein the fermented dairy product is a stirred yoghurt and/or a drinking yoghurt.

7. The process according to claim 3, wherein the fermentation temperature is from 37° C. to 42° C.

8. The process according to claim 4, wherein the desired pH value is from 4.3 to 4.5.

* * * * *